(12) United States Patent
Roth et al.

(10) Patent No.: US 7,954,086 B2
(45) Date of Patent: May 31, 2011

(54) SELF-DESCRIBING KERNEL MODULES

(75) Inventors: Steven Roth, Sunnyvale, CA (US); Carl E. Davidson, Los Gatos, CA (US); Eric W. Hamilton, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2111 days.

(21) Appl. No.: 10/440,144

(22) Filed: May 19, 2003

(65) Prior Publication Data
US 2004/0237070 A1 Nov. 25, 2004

(51) Int. Cl.
G06F 9/44 (2006.01)

(52) U.S. Cl. ......... 717/121; 717/106; 717/140; 717/162

(58) Field of Classification Search .................. None
See application file for complete search history.

(56) References Cited

U.S. PATENT DOCUMENTS

| | | | |
|---|---|---|---|
| 5,077,658 A * | 12/1991 | Bendert et al. ................ | 707/1 |
| 5,634,058 A | 5/1997 | Allen et al. | |
| 5,778,226 A | 7/1998 | Adams et al. | |
| 5,805,899 A * | 9/1998 | Evans et al. ................... | 717/170 |
| 5,956,507 A | 9/1999 | Shearer, Jr. et al. | |
| 6,185,578 B1 * | 2/2001 | Yokote et al. ................. | 707/203 |
| 6,381,735 B1 | 4/2002 | Hunt | |
| 6,467,075 B1 * | 10/2002 | Sato et al. ...................... | 716/18 |
| 6,658,659 B2 * | 12/2003 | Hiller et al. .................... | 717/170 |
| 6,988,263 B1 * | 1/2006 | Hussain et al. ............... | 717/128 |
| 7,076,770 B2 * | 7/2006 | Handal ........................ | 717/136 |
| 2002/0023211 A1 * | 2/2002 | Roth et al. ..................... | 713/164 |
| 2003/0056197 A1 * | 3/2003 | Dennis et al. ................. | 717/126 |
| 2004/0123276 A1 * | 6/2004 | Knueven et al. .............. | 717/140 |
| 2004/0221275 A1 * | 11/2004 | Handal ......................... | 717/136 |

OTHER PUBLICATIONS

Leffler, Samuel J., et al., "Building Berkeley UNIX Kernels with Config.", Computer Systems Research Group, Department of Electrical Engineering and Computer Science, University of California, Berkeley, CA. Apr. 17, 1991.

* cited by examiner

Primary Examiner — Michael J Yigdall

(57) ABSTRACT

A method, and a corresponding mechanism, are used for creating a self-describing kernel module. The method includes the steps of expressing data describing a module in a modmeta file format and creating a C language source file. The C language source file is created by translating the expressed data into a series of C language data structures, wherein the series of C language data structures comprises the C language source file. The C language source file is then compiled and linked into the module itself, thus making the module contain its own descriptive data.

25 Claims, 4 Drawing Sheets

SELF-DESCRIBING KERNEL MODULES

TECHNICAL FIELD

The technical field is processes and mechanisms used in configuring UNIX® operating systems. More particularly, the technical field relates to processes and mechanism for configuring kernel modules.

BACKGROUND

One central component of a computer system operating in a UNIX® environment is an operating system kernel. In a typical UNIX® system, many applications, or processes may be running. All these processes use a memory-resident kernel to provide system services. The kernel manages the set of processes that are running on the system by ensuring that each such process is provided with some central processor unit (CPU) cycles when needed by the processes and by arranging for each such process to be resident in memory so that the process can run when required. The kernel provides a standard set of services that allows the processes to interact with the kernel and to simplify the task of the application writer. In the UNIX® environment, these services are sometimes referred to as "system calls," because the process calls a routine in the kernel (system) to undertake some specific task. Code in the kernel will then perform the task for the process, and will return a result to the process. In essence, the kernel fills in the gaps between what the process intends to happen, and how the system hardware needs to be controlled to achieve the process's objective.

The kernel's standard set of services is expressed as kernel modules (or simply, modules). The kernel typically includes modules such as drivers, including Streams drivers and device drivers, file system modules, scheduling classes, Streams modules, and system calls. These modules are compiled and subsequently linked together to form the kernel. Subsequently, when the system is started or "booted up", the kernel is loaded into memory.

Each module in the kernel has its own unique configuration. Some modules may include tunables, which govern the behavior of the kernel. Some tunables enable optional kernel behavior, and allow a system administrator to adapt a kernel to the administrator's own specific desires. In the discussion that follows, a master file means a file that gives configuration information for one or more kernel modules; a module means any separately configurable unit of kernel code; a system file means a file that contains administrator configuration choices; and module metadata means data that describes a module's capabilities and characteristics. In current UNIX® systems, module metadata are stored in master files. A system file is a flat text file that describes all of the configuration settings in a compact, machine-readable format.

SUMMARY

What is disclosed is a method for creating a self-describing kernel module. The method includes the steps of expressing data describing a module in a modmeta file format and creating a C language source file. The C language source file is created by translating the expressed data into a series of C language data structures, where the series of C language data structures includes the C language source file. The C language source file is then compiled and linked into the module itself, thus making the module contain its own descriptive data.

Also disclosed is a computer readable medium that includes routines that, when executed, performs the steps of expressing data describing a module in a modmeta file format and creating a C language source file. The C language source file is created by translating the expressed data into a series of C language data structures, where the series of C language data structures includes the C language source file. The C language source file is then compiled and linked into the module itself, thus making the module contain its own descriptive data.

Further, what is disclosed is a mechanism for creating self-describing kernel modules. The mechanism includes a modineta compiler that translates the modmeta data file into a source code file. The source code file is a series of contiguous, variant length data structures.

Finally, what is disclosed is a data structure for a kernel that includes self-describing kernel modules. The data structure includes a kernel executable, a kernel registry, and a self-describing kernel module. The self-describing kernel module includes kernel code and a modmeta table linked to the kernel code and contained within the self-describing kernel module.

DESCRIPTION OF THE DRAWINGS

The detailed description will refer to the following figures in which like numerals refer to like items, and in which.

DETAILED DESCRIPTION

Figure 1:
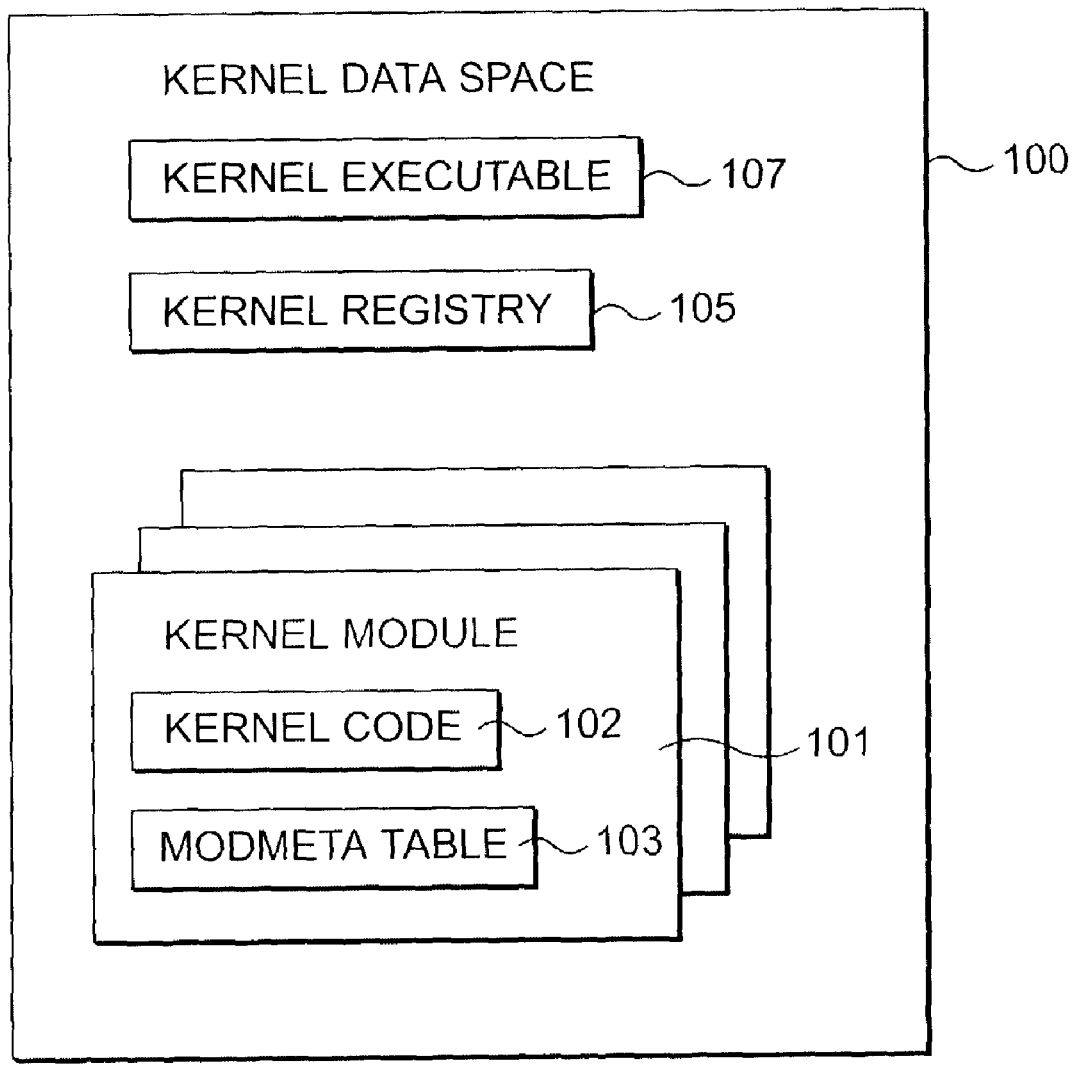
FIG. 1 is a block diagram of an improved kernel structure that provides self-describing features.

In typical UNIX® systems, a kernel is initially built with a basic set of modules. The basic set of modules should comprise at least those modules needed to provide the standard set of services to applications. However, additional modules may be built into the kernel according to a system administrator's requirements and specifications. For example, an administrator may prefer to load certain device driver modules based on the frequency of usage of those modules.

In a typical UNIX® system, the metadata describing each module are stored in data files, called master files in some prior art systems, which are stored separately from the modules they describe. The programs that build and maintain kernels read these files to gather necessary information about the modules.

These features of current UNIX® systems impose some limitations on system reliability and flexibility. One such limitation is the possibility of outdated or missing master files. Because these prior art systems store these master files separately from the modules they describe, it is possible for the master files to be out of date with respect to changes made to the module. For example, a module could be replaced with a newer version, leaving its master file still describing the old version. It is also possible for the master files to be lost, as when a system administrator mistakenly removes the master file.

Another limitation is the need to compile kernel code on a user's system. Such compiling begins with creating and compiling a conf.c file, which brings administrator-chosen tunable values into the kernel. Administrator chosen values are contained in system files. The conf.c file also brings descriptive information about the tunables, and device switch tables and similar tables into the kernel. The information needed for the tunables and the tables is contained in master and system files that exist outside the kernel space. Finally, the conf.c file contains lists of pointers to boot-time initialization routines for drive modules and other modules. A config routine generates these pointer lists using information in the master and system files. The config routine takes a file describing a system's tunable parameters and hardware support, and generates a collection of files that are then used to build a UNIX® kernel appropriate to a specific configuration. To avoid the need for compiling a conf.c file to accomplish the functions described above, requires giving the kernel code access to its own configuration data. More specifically, and as described in more detail below, each of the kernel's individual modules must have access to its own module metadata.

In at least one current UNIX® environment, the operating system kernel is a collection of just under 300 modules. Each module contains executable code and data to provide some service in the kernel. Some modules are required by design of the operating system; others are chosen by are system administrator. Furthermore, a dependency may exist between or among some of the modules. For example if the system administrator chooses to include module A, the operating system will automatically include module B as well.

Each module has an associated set of data that describes the module's capabilities and characteristics. These data have three audiences: the kernel itself needs the data to be able to use the module; kernel configuration (KC) tools that build the kernel need the data in order to resolve dependencies between modules; and the system administrator uses the data in order to decide which modules to choose.

As noted above, in prior art systems these configuration data were stored in a set of configuration files that were separate and apart from the modules themselves. In an improvement over these prior art systems, these configuration data are no longer stored in a separate file or database. Instead, the configuration data are embedded in the module's code in such a way that both the kernel and the KC tools can read the configuration data. The system administrator can access the configuration data through the KC tools. This approach also removes the possibility that the configuration data can be outdated or missing.

To implement the improved, self-describing kernel modules, a module developer expresses all of the data describing the module (referred to hereafter as "module metadata") in a special file format, designated as a "modmeta file." This file format is described in more detail later. In an embodiment, each such modmeta file is designated using a .modmeta suffix.

The module developer then runs a "modmeta compiler" that translates the modmeta file format into a series of C language data structures to produce a C source file. The developer then combines the resulting C source file along with the rest of the module's code. The end result is that the module's metadata are embedded in the module that the metadata describe. For example, a module called stape would have created an stape.modmeta file, which would be stored along with the stape module's source code files. After the above build process was complete, the module developer would ship the resulting stape module to a system administrator as a single file containing an inseparable combination of the module's code and metadata.

A module's modmeta file may specify the following types of information: module name; module version; module type; description; supported states; supported load times; dependencies on other modules; interfaces or symbols exported by the module; tunable parameters; and initialization functions. Device driver modules additionally will specify driver details, and file system modules will specify file system details. The modmeta file may specify other information in addition to that noted above.

In creating these modmeta files, normal C data structures cannot be used because normal C data structures have embedded pointers, and pointers do not have usable values until the modules are linked into a complete kernel. The KC tools need to be able to extract the data before the kernel is completely configured. To overcome this limitation with C data structures, the herein described method and mechanism use contiguous, variant length data structures, i.e., very carefully tailored C data structures that do not have any embedded pointers.

Normal C data structures also cannot be used because their use would require all modules to be recompiled whenever the structure definition changes. This is unacceptable in an environment where different modules are created by different authors in different companies at different times. To overcome this limitation with C data structures, the herein described method and mechanism use discriminated unions: i.e., the C data structures begin with special codes describing how the rest of the structures are interpreted.

As noted above, the KC tools, in addition to the kernel itself, extract module metadata from the module. To facilitate this data extraction function, the C language data structures generated by the modmeta compiler are put into a special section of the module's object file. This special section contains only such data structures. Such data structures are put in this section using a special C compiler "pragma" that controls the section into which data structures are placed. Although module object files typically have all of their data in a single section, an industry-standard "ELF" file format for object files allows multiple data sections. The ELF file format is used by the method and mechanism for self describing kernel modules.

Therefore, the KC tools can easily extract module metadata from a module object file, simply by looking for this special ELF format section in the file's index. When modules are linked together to form a complete kernel, the special ELF format sections used for each of the component modules' metadata are combined into a single section—still separate from all other types of data—in the resulting kernel. This combination of section data is a feature of the linker, which is used by the method and mechanism for self describing kernel modules. Therefore, the KC tools can still easily extract module metadata from a complete kernel, again by looking for the special ELF format section in the kernel file's index. The kernel itself can find its modules' metadata in the same way.

Referring to FIG. 1, a kernel data space 100 is shown to include modules 101, a kernel registry 105, and a kernel executable 107. The kernel registry 105 is a hierarchical database that is persistent across reboots. The kernel executable 107 includes config routines and other kernel code needed to support the modules 101.

In an embodiment, each of the modules 101 may exist in one of four administrator-specified states: unused, static, loaded, and auto. The unused state specifies that the module 101 is not in use. The static state corresponds to the traditional model of statically building a module into the kernel data space 100. The loaded state and auto state each correspond to dynamically loading the module 101. In the loaded state, the module 101 is forced to be loaded (e.g., loaded at boot). In the auto state, the module 101 is loaded in response to a system call.

Following is an example of a modmeta file for a device driver named mydriver. The device driver, mydriver, supports all possible module states, can be loaded with other drivers during boot, or may be called subsequent to boot, has an initialization function to register itself with a driver infrastructure when in a static state, and is dependent on WSIO services in the kernel.

```
module mydriver {
    desc            "My Sample Driver"
    type            wsio_intfc
    version         1.0.0
    states          auto loaded static
    loadtimes       driver_install run
    unloadable
    dependency      wsio
    initfunc        driver_install mydriver_install static
    driver          {
          type            char
          class           lan
          flags           save_conf
    }
}
```

Each module 101 includes kernel code 102 and a modmeta table 103. The code 102 executes a specific function for which the module 101 is designed. The modmeta table 103 describes the characteristics and capabilities of the module 101. Metadata for a module 101 are used by kernel configuration tools when the module 101 is configured. The metadata are also used by various kernel services while the kernel module 101 is in use.

As is apparent from the above description, the metadata for a kernel is comprised of the metadata for each of the kernel's component modules. In the context of metadata definitions, a module is any block of kernel code that should be treated independently during kernel configuration. Each kernel module 101 has its associated metadata stored in its own unique modmeta file. As will be described later, the modmeta file is compiled (producing the modmeta table 103) and linked into the kernel code 102 for the kernel module 101 that the modmeta file describes. This compiling and linking may be completed in a development environment when a modmeta compiler is not provided with a UNIX® distribution.

Figure 2:
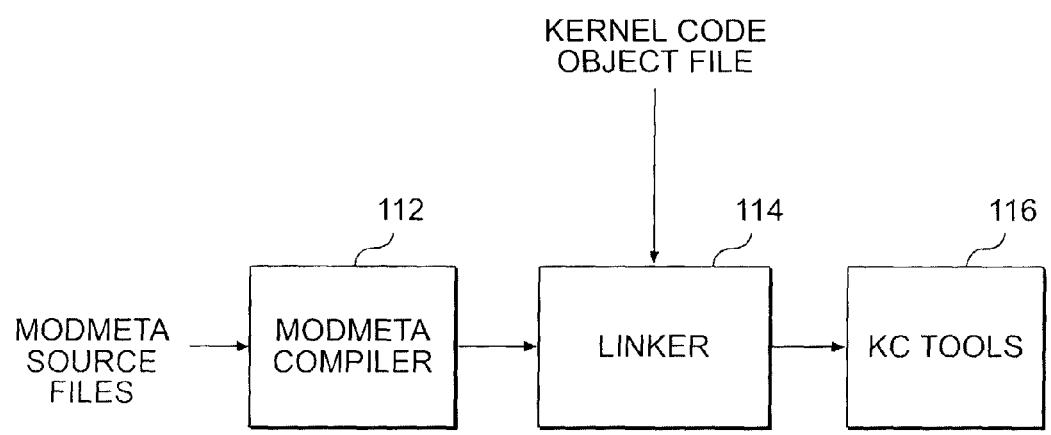
FIG. 2 is a block diagram of an embodiment of a mechanism that provides self-describing kernel modules.

FIG. 2 is a block diagram of a mechanism 110 for implementing self-describing kernel modules. The mechanism 110 includes a modmeta compiler 112 that receives modmeta source files and produces C language source files, which are then compiled with a standard C compiler to created modmeta object files, a linker 114 that receives the modmeta object files and kernel code object files, and links the two files to produce a module object file, and KC tools 116 that allows a system administrator to specify certain details of the self-describing kernel modules.

Figure 3:
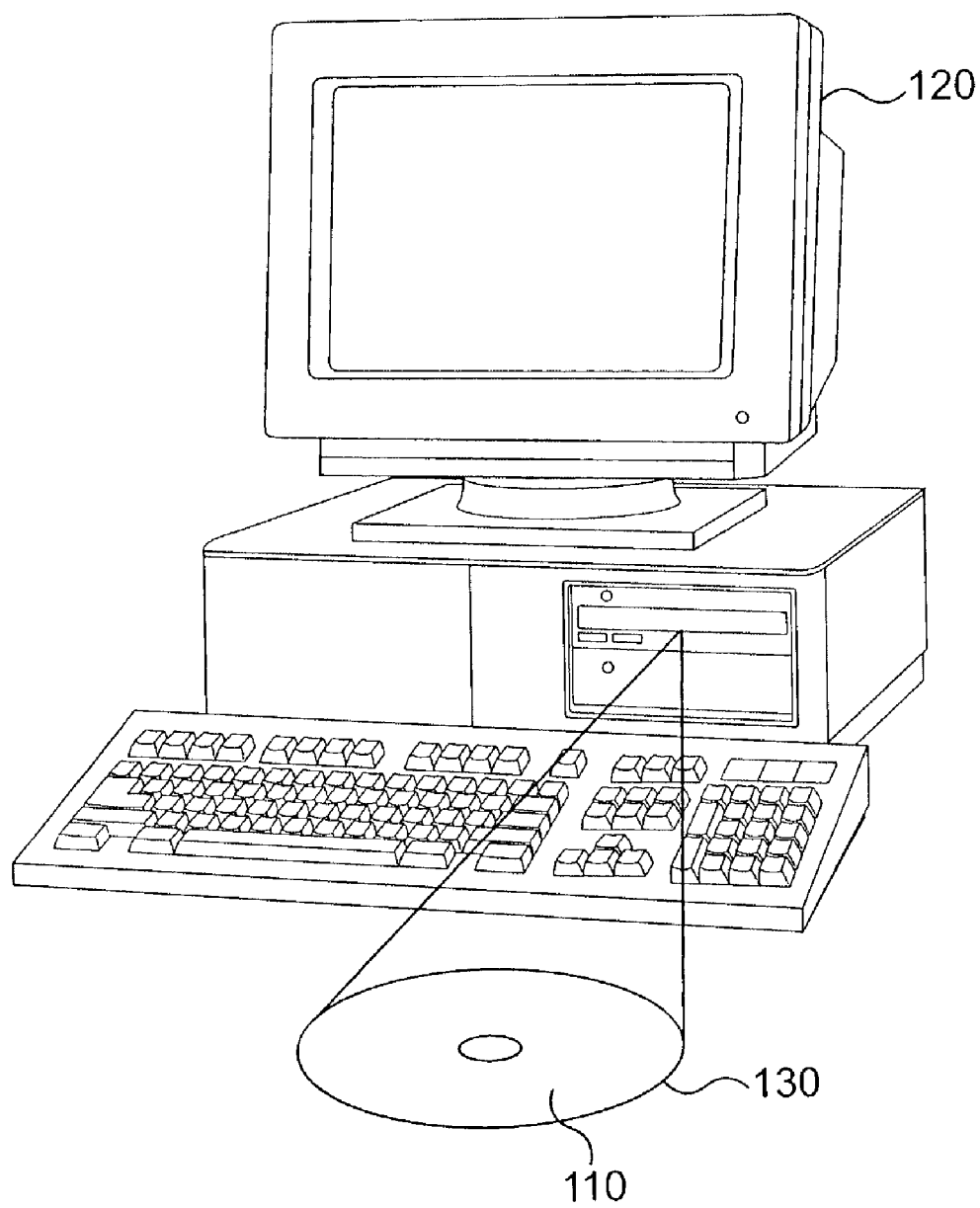
FIG. 3 illustrates a computer-readable medium that incorporates routines used to provide a self-describing kernel module.

FIG. 3 shows a computer system 120 using a UNIX® operating system. To implement self-describing kernel modules, a computer readable medium 130 is provided with appropriate programming, including the modmeta compiler 112. The modmeta compiler, in combination with other tools, operates on the modmeta files for kernel modules to create the required self describing kernel modules. Alternatively, the computer readable medium 130 may include the kernel code 100 (see FIG. 1), which has been processed to invoke the self describing kernel module features, along with the KC tools 116 that the system administrator uses, for example, to select tunable values.

The computer readable medium 130 may be any known medium, including optical discs, magnetic discs, hard discs, and other storage devices known to those of skill in the art. Alternatively, the programming required to implement the self describing kernel modules may be provided using a carrier wave over a communications network such as the Internet, for example.

Figure 4:
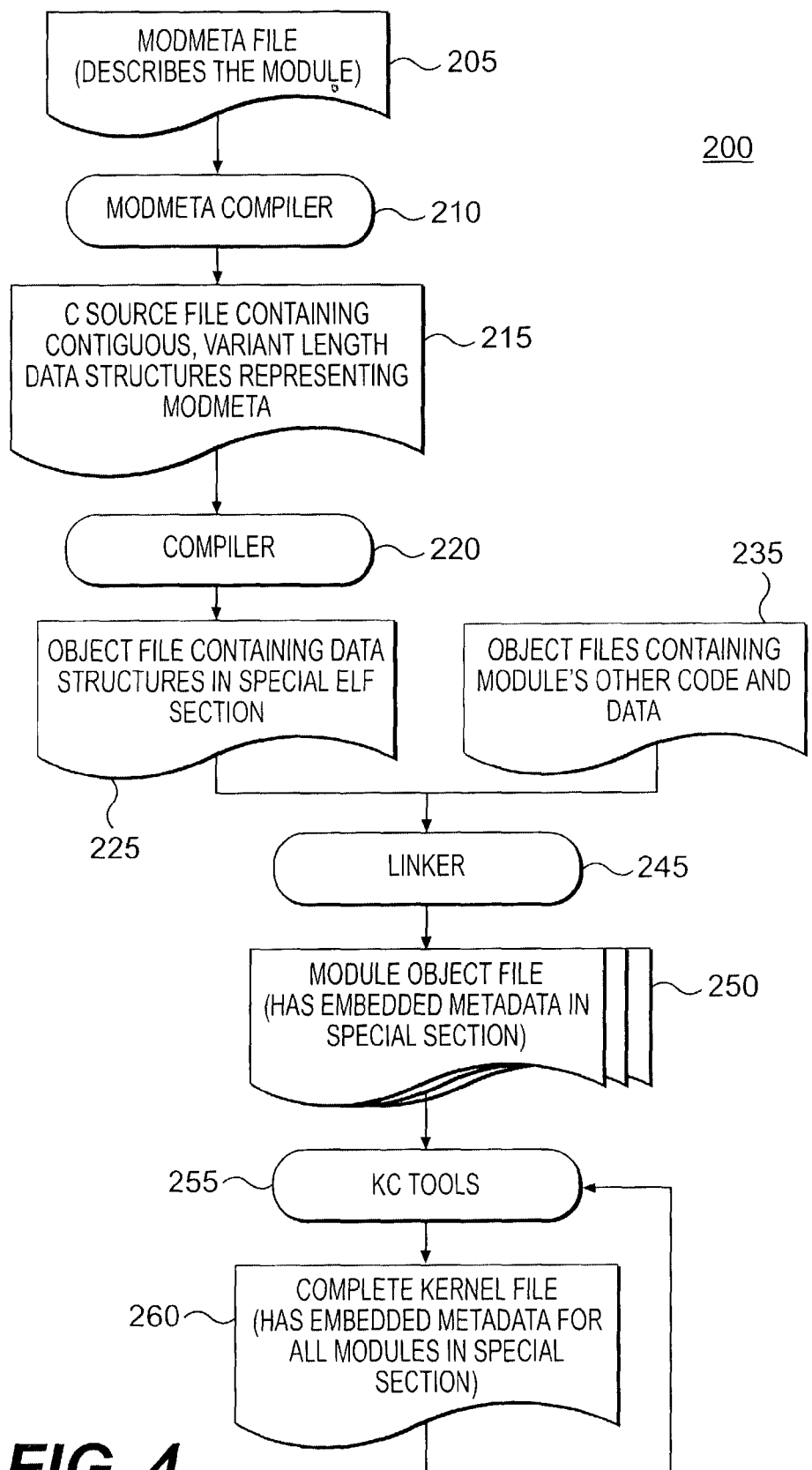
FIG. 4 is a flow chart illustrating steps to establish a self-describing kernel module.

FIG. 4 is a flow chart illustrating a process 200 for implementing self describing kernel modules. The process begins when a modmeta file is created describing a module, block 205. In block 210, a modmeta compiler is used to compile the modmeta file. Compiling the modmeta file results in a file in C source code language that comprises contiguous, variant length data structures to represent the modmeta table, block 215. Next, in block 220, the C source code file is compiled, block 220. Compiling the C source code file results in an object file that comprises data structures in a special ELF-format section, block 225.

Next, object file comprising the module's other code and data are retrieved, block 235. In block 245, the modmeta object file and the code object files are linked. As a result of linking, a single object file (block 250) is created, combining the contents of the modimeta object file and code object files. In block 255, an administrator uses kernel configuration tools to specify tunable variables, and to make further changes to the module. The result of application of the kernel configuration tools is a complete kernel file having embedded metadata for all the kernel modules, block 260.

We claim:

1. A method for creating a self-describing kernel module, comprising:
   expressing data describing a module in a modmeta file format, the data including
      a module name,
      a module version,
      a module type, and
      a module description which includes one or more of
         a text description,
         an indication of supported states,
         an indication of supported load times,
         an indication of dependencies with respect to other modules,
         a description of export and import interfaces,
         a description of tunable parameters, and
         a description of initialization functions;
   creating a C language source file, comprising translating the expressed data into a series of C language data structures, wherein the data structures comprise contiguous, variant length C data structures without embedded pointers, and wherein the series of C language data structures comprises the C language source file;
   compiling the C language source file into machine-readable form; and
   linking the machine-readable form of the C language source file with object files containing the module's code.

2. The method of claim 1, further comprising embedding the machine-readable form data into kernel code of the module being described.

3. The method of claim 2 wherein embedding comprises storing the machine-readable form of the C language source file in an ELF-format section, wherein the data can be easily extracted.

4. The method of claim 3, wherein storing the machine-readable form data in the ELF-format section comprises using a C compiler pragma.

5. The method of claim 3, wherein data in separate ELF-format sections of kernel modules are combined by linking the data into a separate ELF-format section of a compiled kernel, so that the data can still be easily extracted even after the kernel is linked.

6. The method of claim 2, further comprising applying a set of kernel configuration tools to the embedded data and the kernel code.

7. The method of claim 1, further comprising using C data structures to express discriminated unions.

8. A computer readable medium comprising routines to create self-describing kernel modules, wherein the routines when executed comprise the steps of:
   expressing data describing a module in a modmeta file format, the data including
      a module name,
      a module version,
      a module type, and
      a module description which includes one or more of
         a text description,
         an indication of supported states,
         an indication of supported load times,
         an indication of dependencies with respect to other modules,
         a description of export and import interfaces,
         a description of tunable parameters, and
         a description of initialization functions;
   creating a C language source file, comprising translating the expressed data into a series of C language data structures, wherein the data structures comprise contiguous, variant length C data structures without embedded pointers, and wherein the series of C language data structures comprises the C language source file;
   compiling the C language source file into machine-readable form; and
   linking the machine-readable form of the C language source file with object files containing the module's kernel code.

9. The computer-readable medium of claim 8, wherein the steps further comprise embedding the machine-readable form data into kernel code of the module being described.

10. The computer-readable medium of claim 9, wherein embedding comprises storing the machine-readable form of the C language source file in an ELF-format section, wherein the data can be easily extracted.

11. The computer-readable medium of claim 10, further comprising a C compiler pragma, wherein the C compiler pragma is usable for storing the machine-readable form data in the ELF-format section.

12. The computer-readable medium of claim 10, Wherein data in separate ELF-format sections of kernel modules are combined by linking the data into a separate ELF-format section of a compiled kernel, so that the data can still be easily extracted even after the kernel is linked.

13. The computer-readable medium of claim 9, wherein the steps further comprise applying a set of kernel configuration tools to the embedded data and the kernel code.

14. The computer-readable medium of claim 10, wherein the steps further comprise using C data structures to express discriminated unions.

15. A mechanism for creating self-describing kernel modules, comprising: a modmeta compiler that executes on one or more computer processors to translate a modmeta data file into a source code file, wherein the source code file comprises a series of contiguous, variant length data structures without embedded pointers; and a linking mechanism to link the modmeta with object code corresponding to kernel code of the module to generate executable code stored in an electronic memory with a computer system, the modmeta data file including
   a module name,
   a module version,
   a module type, and
   a module description which includes one or more of
      a text description,
      an indication of supported states,
      an indication of supported load times,
      an indication of dependencies with respect to other modules,
      a description of export and import interfaces,
      a description of tunable parameters, and
      a description of initialization functions.

16. The mechanism of claim 15, wherein the data structures are C language data structures.

17. The mechanism of claim 15, further comprising means for embedding machine-readable form data into kernel code of the module being described.

18. The mechanism of claim 17, wherein the embedding means comprises a C compiler pragma.

19. The mechanism of claim 17, wherein the machine-readable form data are embedded in an ELF-format section, wherein the data can be easily extracted.

20. The mechanism of claim 15, further comprising a set of kernel configuration tools usable to modify the embedded data.

21. A data structure for a kernel comprising self-describing kernel modules, the data structure comprising:
   a kernel executable stored in a computer;
   a kernel registry stored in the computer; and
   a self-describing kernel module stored in the computer or a computer-readable media, comprising:
      kernel code, and
      a modmeta table linked to the kernel code and contained within the self-describing kernel module,
   wherein the modmeta table is compiled from C language data structures comprising contiguous, variant length C data structures without embedded pointers and wherein the modmeta table includes
      a module name,
      a module version,
      a module type, and
      a module description which includes one or more of
         a text description,
         an indication of supported states,
         an indication of supported load times,
         an indication of dependencies with respect to other modules,
         a description of export and import interfaces,
         a description of tunable parameters, and
         a description of initialization functions.

22. The data structure of claim 21, wherein machine-readable form data is embedded into kernel code of a module being described.

23. The data structure of claim 22, wherein the embedded data are stored an ELF-format section, wherein the data can be easily extracted.

24. The data structure of claim 22, wherein the machine-readable form data is stored in the ELF-format section comprises using a C compiler pragma.

25. The data structure of claim 24, wherein data in separate ELF-format sections of the self-describing kernel modules are combined by linking the data into a separate ELF-format section of a compiled kernel, wherein the data can still be easily extracted even after the linking.

* * * * *

UNITED STATES PATENT AND TRADEMARK OFFICE
CERTIFICATE OF CORRECTION

| | | |
|---|---|---|
| PATENT NO. | : 7,954,086 B2 | Page 1 of 1 |
| APPLICATION NO. | : 10/440144 | |
| DATED | : May 31, 2011 | |
| INVENTOR(S) | : Roth et al. | |

It is certified that error appears in the above-identified patent and that said Letters Patent is hereby corrected as shown below:

In column 7, line 46, in Claim 12, delete "Wherein" and insert -- wherein --, therefor.

In column 8, line 55, in Claim 23, delete "stored an" and insert -- stored in an --, therefor.

Signed and Sealed this
Twenty-second Day of November, 2011

David J. Kappos
*Director of the United States Patent and Trademark Office*